(12) United States Patent
Hall et al.

(10) Patent No.: US 8,190,609 B1
(45) Date of Patent: May 29, 2012

(54) IDENTIFYING ALTERNATIVE PRODUCTS

(75) Inventors: Robert Hall, Pittsburgh, PA (US); Andy Carlson, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/212,749

(22) Filed: Aug. 18, 2011

(51) Int. Cl.
*G06F 7/00* (2006.01)
*G06F 17/30* (2006.01)

(52) U.S. Cl. ........................................ 707/736; 707/758

(58) Field of Classification Search .................. 707/706, 707/765, 736, 1, 999.001, 758
See application file for complete search history.

(56) References Cited

U.S. PATENT DOCUMENTS

| | | | |
|---|---|---|---|
| 8,024,337 B1 * | 9/2011 | Baluja et al. .................. | 707/736 |
| 2009/0319517 A1 * | 12/2009 | Guha et al. ........................ | 707/5 |
| 2010/0191619 A1 * | 7/2010 | Dicker et al. .................... | 705/27 |
| 2010/0198655 A1 * | 8/2010 | Ketchum et al. ................ | 705/10 |

OTHER PUBLICATIONS

Office Action dated Jan. 5, 2012, issued in co-pending U.S. Appl. No. 13/244,893, filed Sep. 26, 2011.

* cited by examiner

*Primary Examiner* — Kimberly Wilson
(74) *Attorney, Agent, or Firm* — Johnson, Marcou & Isaacs, LLC

(57) ABSTRACT

A product catalog system includes a product catalog having information regarding products for sale online by various merchants. The product catalog system transmits information regarding products in response to queries for a target product and also transmits information regarding products that serve as alternatives to the target product. The product catalog system includes a product alternatives module that identifies product alternatives based on information regarding a multitude of received queries and information regarding products that were selected from other products presented in response to the queries. The alternatives module computes an association weight for pairs of products that indicates the likelihood that the two products are alternatives. This association weight is based on the query and product information and further based on the number of times that the two products were the subject of a comparison query.

25 Claims, 5 Drawing Sheets

500

| | Product A | Product B | Product C | Product D |
|---|---|---|---|---|
| Query 1 | 291 | 37 | 61 | 4 |
| Query 2 | 82 | 405 | 201 | 90 |
| Query 3 | 110 | 21 | 174 | 0 |
| Query 4 | 22 | 101 | 39 | 544 |

Products — 505
Queries — 510
515

Fig. 5

IDENTIFYING ALTERNATIVE PRODUCTS

TECHNICAL FIELD

The present disclosure relates generally to electronic product catalogs, and more specifically, to identifying products that are related or serve as alternatives to one another using information regarding queries.

BACKGROUND

Computer networks, such as the Internet, enable transmission and reception of a vast array of information. In recent years, for example, some commercial retail stores have attempted to make product information available to customers over the Internet. It is becoming increasingly popular for information providers to provide mechanisms by which customers can compare such product information across multiple manufacturers and retailers. For simplicity, manufacturers, retailers, and others that sell products to customers are interchangeably referred to herein as "merchants." For example, Internet search/shopping sites allow customers to compare pricing information for products across multiple merchants.

Customers searching for a product often desire to view products that are related to or serve as alternatives to that product. For example a customer searching for a particular tablet computer may want to view product information regarding comparable tablet computers offered by another manufacturer. However, conventional methods for identifying alternative products are inadequate and often require a significant amount of time to gather enough data to predict with confidence that two products are alternatives.

SUMMARY

In certain exemplary embodiments, a system for determining whether a first product is an alternative of a second product includes a processor, computer-readable memory, and a non-transitory computer-readable storage device. The system identifies a query associated with the first product and a query associated with the second product. The system determines a number of times that a query associated with the first product is included in a comparison query with a query associated with the second product. The system determines whether the first product is an alternative of the second product based at least on the number of times that a query associated with the first product is included in a comparison query with a query associated with the second product.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

BRIEF DESCRIPTION OF THE DRAWINGS

FIG. 5 is a block flow diagram depicting a shopping query table, in accordance with certain exemplary embodiments.

DETAILED DESCRIPTION OF EXEMPLARY EMBODIMENTS

Overview

Figure 1:
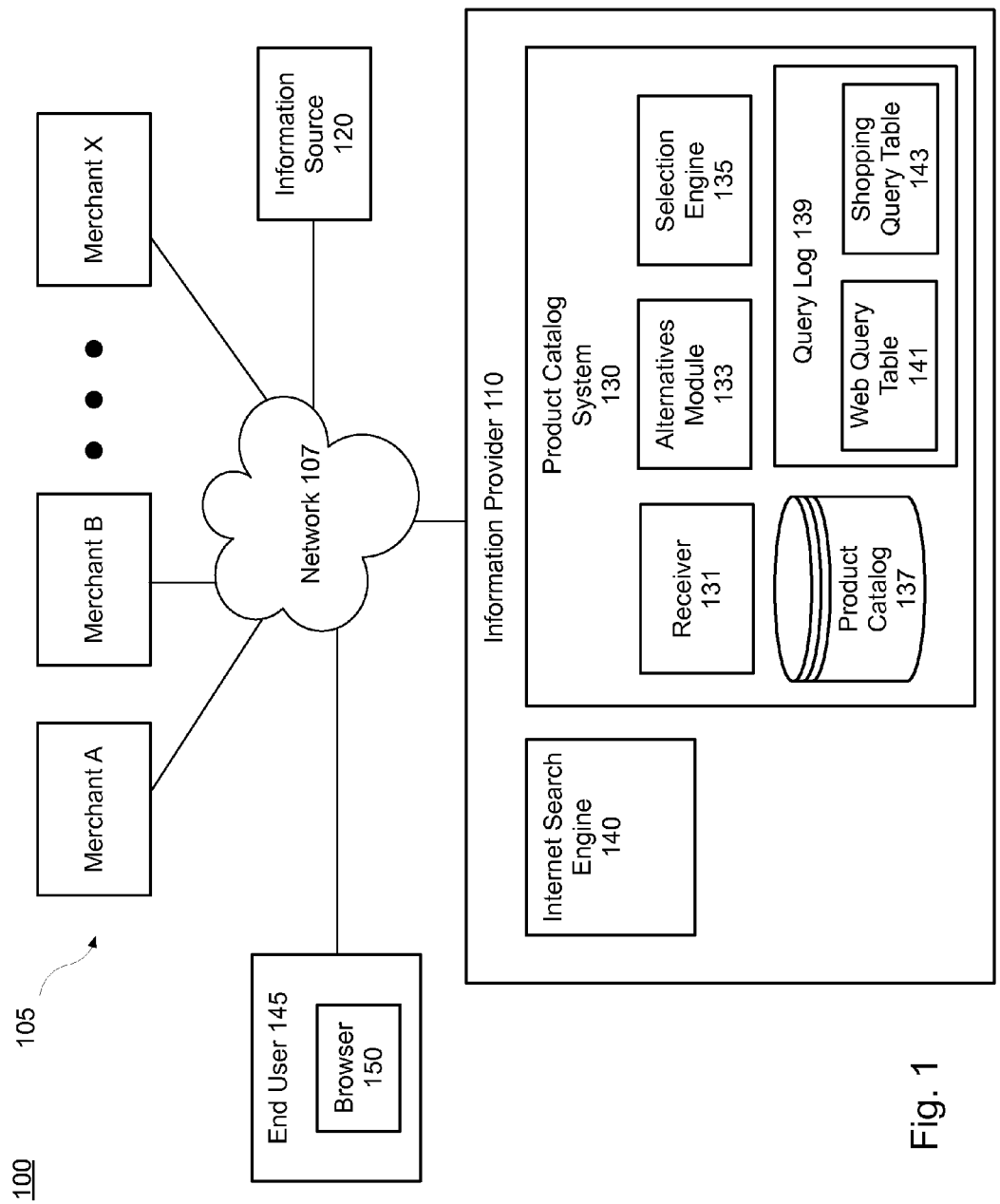
FIG. 1 depicts a system for identifying alternative products and presenting information regarding the alternative products, in accordance with certain exemplary embodiments.

The methods and systems described herein enable identification of alternative products using query information. For the purposes of this specification, two products are considered alternatives or related if the two products can be considered alternatives of one another, or if one product is the successor to the other. For example, an updated version of a product is considered a successor of that product.

The system includes a product catalog system that is implemented in hardware and/or software. The product catalog system receives information regarding products and/or product offers from multiple merchants and transmits product information to users in response to queries. The product catalog system can log received queries in a query log. The product catalog system also can log, in the query log, information regarding products and/or product offers selected by the users after receiving the product information.

The system also includes or is associated with an Internet search engine. The Internet search engine receives queries and provides search results in response to the received queries. Similar to the product catalog system, information regarding the queries received by the Internet search engine is logged.

An alternatives module of the product catalog system can analyze the information stored in the query logs to identify alternative products for at least a portion of the products. The alternatives module can, for each product, assign a weight to each identified alternative product such that the information regarding the most relevant alternative products can be provided to users along with information regarding the target product.

In one implementation, the alternatives module utilizes information regarding queries that are directed to a comparison between two products to determine whether the queries are alternatives. For example, a query that includes the term "vs." or "versus" disposed between two product names (e.g., Product A vs. Product B) typically indicates that a user is searching for information that compares or contrasts the two products. These queries can be a good source of up-to-date information regarding alternative products. The alternatives module also can utilize information regarding the associations between queries and products to identify alternative products. After identifying alternative products, the product catalog system can present information regarding the alternative products along with information regarding a product that the user submitted a query for. In this way, the user can compare the searched product with the alternative products with little effort.

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. Moreover, any reference to an act being performed by a computer should not be construed as being performed by a single computer as the act may be performed by more than one computer. The functionality of the exemplary embodiments will be explained in more detail in the following description, read in conjunction with the figures illustrating the program flow.

Turning now to the drawings, in which like numerals indicate like (but not necessarily identical) elements throughout the figures, exemplary embodiments are described in detail.

System Architecture

FIG. 1 depicts a system 100 for identifying alternative products and presenting information regarding the alternative products, in accordance with certain exemplary embodiments. As depicted in FIG. 1, the system 100 includes network devices 105, 110, 120, and 145, that are configured to communicate with one another via one or more networks 107. Each network 107 includes a wire or wireless telecommunication means by which network devices (including network devices 105, 110, 120, 145 can exchange data. For example, each network 107 can include a local area network ("LAN"), a wide area network ("WAN"), an intranet, an Internet, a mobile telephone network, or any combination thereof. Throughout the discussion of exemplary embodiments, it should be understood that the terms "data" and "information" are used interchangeably herein to refer to text, images, audio, video, or any other form of information that can exist in a computer-based environment.

Each network device 105, 110, 120, 145 includes a device capable of transmitting and receiving data over the network 107. For example, each network device 105, 110, 120, 145 can include a server, desktop computer, laptop computer, smartphone, handheld computer, personal digital assistant ("PDA"), or any other wired or wireless, processor-driven device. In the exemplary embodiment depicted in FIG. 1, the network devices 105, 110, 120, 145 are operated by merchants, an information provider, an information source, and end users, respectively.

The end user network devices 145 each include a browser application module 150, such as Microsoft Internet Explorer, Firefox, Netscape, Google Chrome, or another suitable application for interacting with web page files maintained by the information provider network device 110 and/or other network devices. The web page files can include text, graphic, images, sound, video, and other multimedia or data files that can be transmitted via the network 107. For example, the web page files can include one or more files in the Hypertext Markup Language ("HTML"). The browser application module 150 can receive web page files from the information provider network device 110 and can display the web pages to an end user operating the end user network device 145. In certain exemplary embodiments, the web pages include information from a product catalog 137 of a product catalog system 130, which is maintained by the information provider network device 110. In certain exemplary embodiments, the web pages include information from an Internet search engine 140 of the information provider network device 110 or another network device associated with or unrelated to the information provider network device 110. The product catalog system 130 and other components of FIG. 1 are described in more detail hereinafter with reference to the method illustrated in FIG. 2.

System Process

Figure 2:
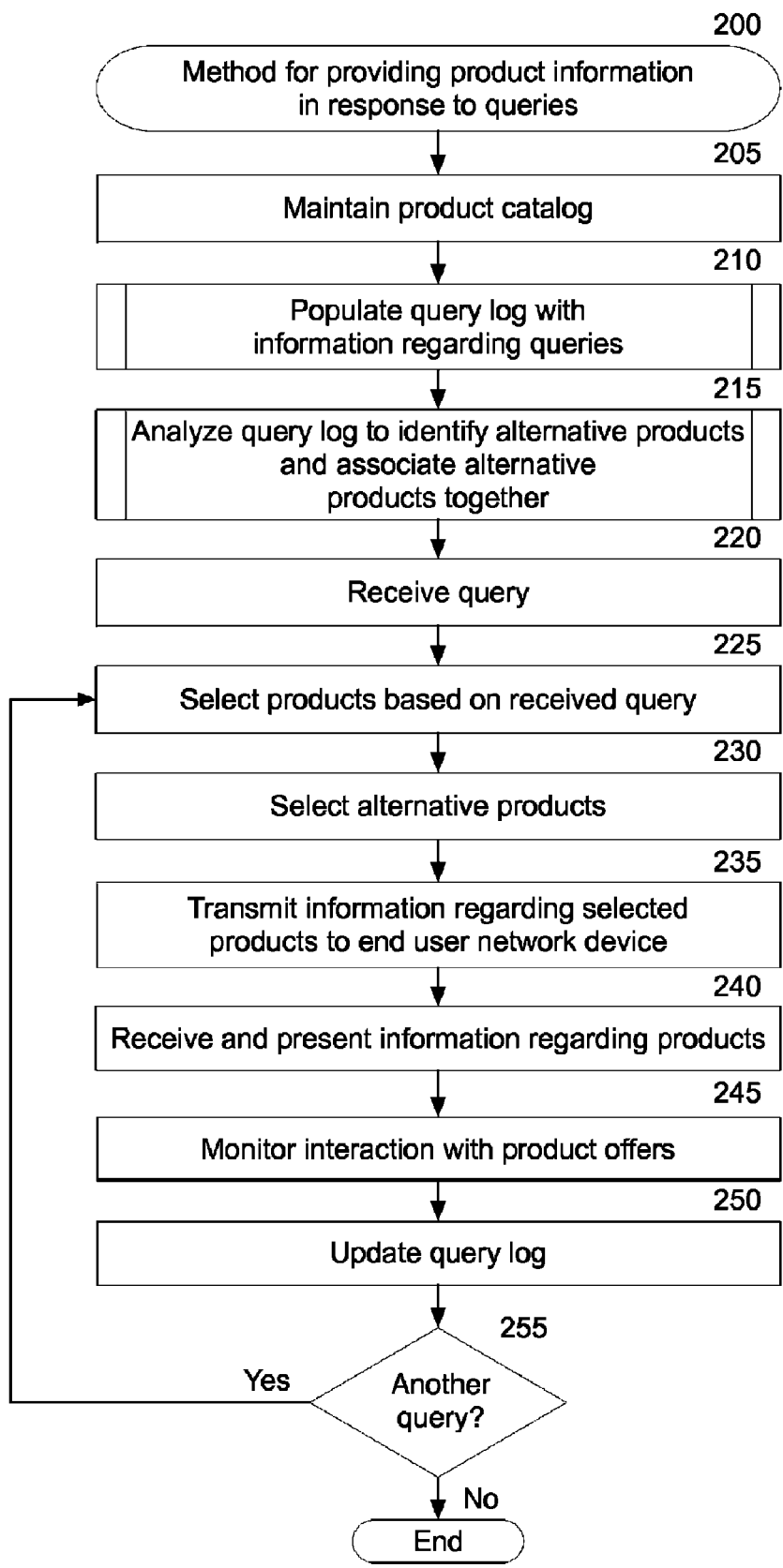
FIG. 2 is a block flow diagram depicting a method for providing product information in response to queries, in accordance with certain exemplary embodiments.

FIG. 2 is a block flow diagram depicting a method 200 for providing product information in response to queries, in accordance with certain exemplary embodiments. The method 200 is described with reference to the components illustrated in FIG. 1.

In block 205, the product catalog system 130 maintains the product catalog 137. The product catalog 137 includes a data structure, such as one or more databases and/or electronic records, that includes information regarding products and/or product offers from at least one merchant 105. For each product, the information in the product catalog 137 typically includes at least one product identifier, such as a Global Trade Item Number ("GTIN"), Universal Product Code ("UPC"), Manufacturer Part Number ("MPN"), International Standard Book Number ("ISBN"), European Article Number ("EAN"), Japanese Article Number ("JAN"), and/or brand name and model number combination. The information also can include, for each product, a product title, a product description, one or more images, one or more videos, a price, a product category, a product review or rating, and/or any other suitable information associated with a product.

In certain exemplary embodiments, a receiver module 131 of the product catalog system 130 receives information that is included in the product catalog 137 in electronic data feeds and/or hard copy provided by one or more merchants 105 and/or another information source 120, such as a specialized information aggregator. For example, the merchant 105 and/or information source 120 may periodically provide batched or unbatched product data in an electronic feed to the receiver module 131. The receiver module 131 also may receive product information from scanned product documentation and/or catalogs. In certain exemplary embodiments, the receiver module 131 also may receive the product data from a screen scraping mechanism or a web crawling mechanism, which is included in or associated with the product catalog system 130. For example, the screen scraping mechanism may capture product information from the merchant and/or information source websites. In certain exemplary embodiments, end users may view information from the product catalog 137 via browsers 150 on their respective end user network devices 145.

In block 210, the product catalog system 130 populates a query log 139 with information regarding queries received by the Internet search engine 140 and/or the product catalog system 130. The query log 139 includes a data structure, such as one or more databases and/or electronic records, that includes the information regarding the queries. As shown in FIG. 1, the query log 139 includes a web query table 141 for storing information regarding web queries received by the Internet search engine 140 and a shopping query table 143 for storing information regarding queries received by the product catalog system 130. Each table 141, 143 typically stores each received query, for example in the form of a text string, and the frequency of those received queries over some time period. For example, each table 141, 143 may include the number of times each query was received from different users during the previous week, month, or other period of time.

The shopping query table 143 also includes, for each query, information regarding products that were selected by the end users 145 after the query was submitted and results were provided to the end user 145. This information regarding products may include, for each query, information identifying the product selected by end users 145 after receiving the query. For example, if end users 145 selected several versions of a particular tablet computer in response to the query "tablet computer," each of those versions may be included in a table entry for the query "tablet computer." The shopping query table 143 also may include, for each query, the frequency that each product was selected in response to the query. For example, if a first version of the Apple iPad is selected 150 times and a second version of the Apple iPad is selected 300 times, the shopping query table 143 can log this information.

In one embodiment, the shopping query table 143 includes a two dimensional table that is configured such that each column represents a product of the product catalog 137 and each row represents a received query. For example, FIG. 5 is a block diagram depicting a shopping query table 500, in accordance with certain exemplary embodiments. A shown in FIG. 5, the exemplary shopping query table 500 includes columns 505 for products and rows 510 for queries. The cells 515 defined by the columns 505 and rows 510 include the number of times that a product was selected for the corresponding query. For example, Product A was selected 291 times after Query 1 was submitted and was selected 82 times after Query 2 was submitted. If a new query is submitted that is not already included in the shopping query table 143, the product catalog system 130 can add a new row 510 for that query.

Referring back to FIG. 2, in certain exemplary embodiments, the product catalog system 130 has access to a previously populated query log 139. For example, the Internet search engine 140 and the product catalog system 130 may already log this information. In such embodiments, the query log 139 can continue to be updated for each received query. If a previously populated query log 139 is not available, the query log 139 can be populated from received queries until a sufficient amount of data is logged. For example, the query log 139 may be populated according to the method 210 of FIG. 2 discussed in more detail below.

In block 215, an alternatives module 133 of the product catalog system 130 analyzes the information stored in the query log 139 to identify alternative products. In one embodiment the alternatives module 133 evaluates queries directed to the comparison of two products and further evaluates the association between queries and products selected in response to the queries to identify products that are alternatives to one another. The alternatives module 133 can link or otherwise associate alternative products together. The alternatives module 133 also can rank product alternatives for each product such that the most relevant product alternatives are presented to users along with a target product. Block 215 is described in more detail below in connection with FIG. 4.

In block 220, the product catalog system 130 receives a query. For example a user operating the end user network device 145 navigate to an Internet website of the product catalog system 130 using the browser application module 150. At the website, the user may enter a query for a product and the end user network device 145 transmits the query to the information provider network device 145.

In block 225, a selection engine 135 of the product catalog system 130 selects one or more products for transmission to the end user network device 145 based on the received query. In one embodiment, the selection engine 135 attempts to identify the target product or category of product that the user is searching for and selects products or categories of products that satisfy the query.

In block 230, the selection engine 135 selects alternative products for transmission to the end user network device 145. In one embodiment, the selection engine 135 selects from a ranked set of product alternatives for the target product. For example, the alternatives module 133 may identify five product alternatives for the target product and rank the five product alternatives based on their respective association with the target product. In such case, the selection engine 135 may select the higher-ranking product alternatives for which to transmit product offers.

In block 235, the information provider network device 110 transmits information regarding the selected products and the alternative products to the end user network device 145. In block 240, the end user network device 145 receives the information regarding the selected products and the alternative products, and the browser application module 150 presents the received information to the end user operating the end user network device 145. In one embodiment, the browser application module 145 displays the information regarding the alternative products near the bottom of a display screen under the information regarding the selected products.

In block 245, the product catalog system 130 monitors the user's interaction with the products. For example, if the user selects one of the products to obtain a product offer for the product or additional information regarding the product, the browser application module 150 transmits a message to the product catalog system 130 indicating that the product was selected. The browser application module 150 may also navigate to an advertisement landing page or other web page for the selected product. For example, the displayed information for each product may include a link, such as a Uniform Resource Locator ("URL"), to another web page associated with the product.

In block 250, the product catalog system 130 updates the query log 139 based on the query and the user's interaction with the products. In one embodiment, the product catalog system 130 compares the query received in block 220 to queries in the shopping query table 143 to determine whether there is an entry for the received query. If there is not an entry, then the product catalog system 130 creates a new entry for the received query in the shopping query table 143. If the user selected a product, then the product catalog system 130 also updates the shopping query table 143 to indicate that the product was selected for the received query. If the selected product had previously been selected for the received query, for example by another user, then the product catalog system 130 may update the frequency or count for that product and query. If the selected product had not been previously selected, then the frequency may be set at one.

Figure 3:
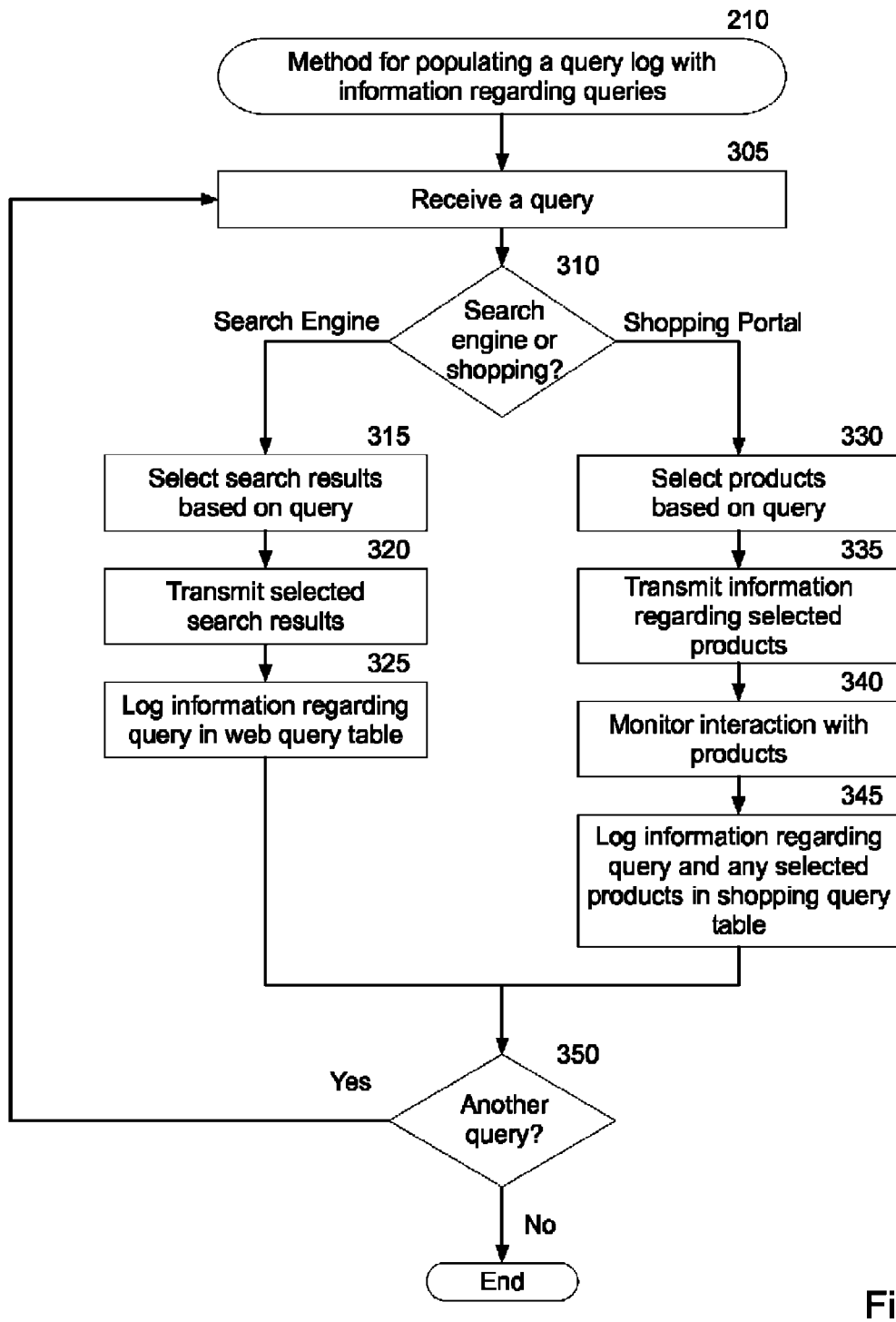
FIG. 3 is a block flow diagram depicting a method for populating a query log with information regarding queries, in accordance with certain exemplary embodiments.

FIG. 3 is a block flow diagram depicting a method 210 for populating a query log 139 with information regarding queries, in accordance with certain exemplary embodiments, as referenced in block 210 of the method 200 of FIG. 2. In block 305, the Internet search engine 140 or the product catalog system 130 receives a query. For example, an end user operating the end user network device 145 may enter a query at a website of the Internet search engine 140 or at a shopping website of the product catalog system 130.

In block 310, if the query is received at the Internet search engine 140, the method 210 follows the "Search Engine" branch to block 315. In block 315, the Internet search engine 140 selects results to provide to the end user network device 145 in response to the query using conventional techniques. In block 320, the information provider network device 110 transmits the selected results to the end user network device 145 and in turn, the browser application module 150 presents the results to the end user operating the end user network device 145.

In block 325, the product catalog system 130 logs information regarding the received query in the web query table 141 of the query log 139. In one embodiment, the product catalog system 130 compares the received query to queries in the web query table 141. If there is a match between the received query and a query in the web query table 141, then the product catalog system 130 updates the frequency for the matching query to indicate that the matching query was received again. If there is not a match, then the product catalog system 130 provides an entry for the received query in the web query table 141 and enters a frequency of one for the received query. After block 325, the method proceeds to block 350.

Referring back to block 310, if the query is received at a shopping website of the product catalog system 130, the method 210 follows the "Shopping Portal" branch to block 330. In block 330, the selection engine 135 selects products to provide to the end user network device 145 based on the query. For example, the selection engine 135 may identify a product that the end user operating the end user network device 145 is searching for and selected information related to that product. If the end user is searching for a type of product, the selection engine 135 may select a multitude of products related to that type of product. In block 335, the information provider network device 110 transmits information regarding the selected products to the end user network device 145 and in turn, the browser application module 150 presents the information regarding the selected products to the end user. Of course, the selection engine 135 also may select information regarding alternative products to send to the end user network device 145 as discussed above in connection with block 230 of the method 200 of FIG. 2.

In block 340, the product catalog system 130 monitors the end user's interaction with the products. In block 345, the product catalog system 130 logs information regarding the received query and any selected products in the shopping query table 143. In certain exemplary embodiments, blocks 340-345 are the same as or substantially similar to blocks 240-245 of the method 200 of FIG. 2. After block 345, the method 210 proceeds to block 350.

In block 350, the Internet search engine 140 and the product catalog system 130 each monitor for queries from the end user network devices 145. If another query is received, then the method 210 follows the "Yes" branch back to block 310. Otherwise, the method 210 ends. Of course, the Internet search engine 140 and the product catalog system 130 can continue to monitor for queries, provide results in response to queries, and update the query log 139 with information regarding the received queries and any selected products provided in response to the received queries.

Figure 4:
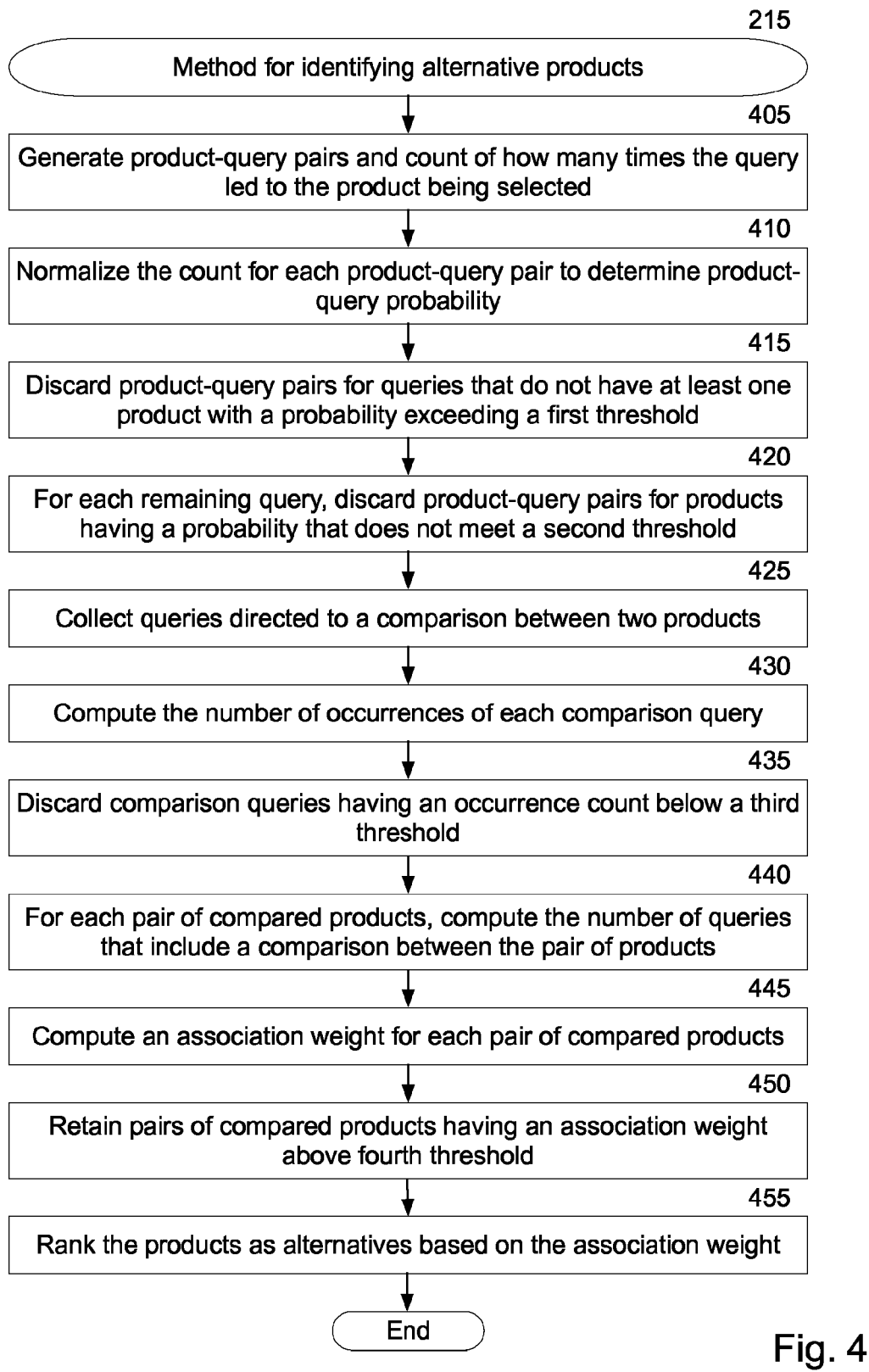
FIG. 4 is a block flow diagram depicting a method for identifying alternative products, in accordance with certain exemplary embodiments.

FIG. 4 is a block flow diagram depicting a method 215 for identifying product alternatives, in accordance with certain exemplary embodiments, as referenced in block 215 of the method 200 of FIG. 2. In block 405, the alternatives module 133 generates product-query pairs for at least a portion of the products having information stored in the product catalog 137. A product-query pair includes a product and a query that resulted in that product being selected by an end user. For example, if a query of "Tablet Computer A" resulted in a selection of a product "Tablet Computer A Wi-Fi with 16 GB Memory," then the alternatives module 133 may generate a product-query pair for that product and that query. This product-query pair may be represented in the form of (q,p) where "q" is a string of characters of the query and "p" is a string of characters of the product. Continuing the tablet computer example, the product-query pair would be (Tablet Computer A, Tablet Computer A Wi-Fi with 16 GB Memory).

The alternatives module 133 also counts the number of times that the query resulted in a selection of the product. This count may be represented in the form of n(q,p). For example, if the query "Tablet Computer A" resulted in a selection of the product "Tablet Computer A Wi-Fi with 16 GB Memory," 200 times, then the n(q,p) for this product-query pair would be 200.

In one embodiment, the alternatives module 133 identifies, for each product, the queries that resulted in a selection of that product. The alternatives module 133 also computes a count of the number of times that each identified query resulted in a selection of that product. In certain exemplary embodiments, this count is tracked in the shopping query table 143 as shown in FIG. 5 and discussed above.

In block 410, the alternatives module 133 computes a probability for each product-query pair by normalizing the count for each product-query pair. This probability indicates how related the product of the product-query pair is to the query of the product-query pair. For example, a product-query pair having a high probability indicates that the product and query of the product-query pair are more related than a product-query pair having a lower probability. In one embodiment, the alternatives module 133 computes the probability for a product-query pair by dividing the count for the product-query pair by the total number of occurrences of the query of that product-query pair. For example, the probability for a product-query pair (p,q) may be computed using Equation 1 below.

$$\text{prob}(p|q) = n(q,p)/n(q_1^*) \qquad \text{Equation 1}$$

In Equation 1, $n(q_1^*)$ is the total number of times the query "q" was received by the product catalog system 130 during a given time period and over all products in the product catalog 137. For example, $n(q_1^*)$ may be computed by summing all of the entries in the row for that query in the shopping query table 143. For example, briefly referring to FIG. 5, the total number of queries for Query 1 would be 291+37+61+4=393. Thus, the probability for Product A given Query 1 would be 291/393=0.74.

In certain exemplary embodiments, the probability computation is modified based on the number of product offers in the product catalog 137 for the product. For example, Equation 1 may be modified as shown in Equations 2-4 below.

$$m(q,p) = n(q,p) * \text{sqrt}(\text{number of product offers for product } p) \qquad \text{Equation 2}$$

$$m(q_1^*) = \text{sum over all products of } m(q,p) \qquad \text{Equation 3}$$

$$\text{prob}(p|q) = m(q,p)/m(q_1^*) \qquad \text{Equation 4}$$

In Equation 2, the original fraction of the number of selections of a product offer for the product "p" divided by the total number of queries "q" is multiplied by the square root of the number of product offers for the product "p" in the product catalog 137. Although the square root is used in Equation 2, other weightings of the number of product offers relative to the original fraction can be used, including no weighting at all.

In block 415, the alternatives module 133 discards the product-query pairs for queries that do not have at least one probability that meets or exceeds a certain threshold, alpha. For example, the alternatives module 133 may discard product-query pairs for queries that do not have at least one probability at or above a threshold of 0.1. The threshold alpha can be tuned based on the results of the method 215. If a query does not have at least one sufficiently high probability, this typically indicates that many different products satisfy the query and that the data may not be very useful in identifying alternative products.

In block 420, for each of the remaining queries, the alternatives module 133 retains the product-query pairs for the products that have a probability that meets or exceeds a second threshold beta and discards the product-query pairs for the products that have a probability below the threshold beta. This threshold beta may be set at a different value than the threshold alpha and can likewise be tuned. In one embodiment, the threshold beta is set at 0.05.

The product-query pairs that remain after the filtering acts of blocks 415-420 represent a mapping of the queries to the products. The tuning thresholds alpha and beta can be adjusted, for example by the alternatives module 133 or an administrator of the product catalog system 130, to control the precision of the mapping.

In block 425, the alternatives module 133 collects queries from the web query table 141 that are directed to a comparison between two products. In certain exemplary embodiments, queries that have a comparison term, for example disposed between two products or two query terms each associated with a product, may be deemed a comparison query and collected by the alternatives module 133. Exemplary comparison terms include, but are not limited to, vs, vs., versus, compared to, compares, and against. Queries that include certain questions along with two products or query terms associated with two products also may be considered comparison queries. For example, a query that begins with "Which is better" and includes information regarding two products may be deemed a comparison query by the alternatives module 133. The alternatives module 133 can analyze each query of the web query table 141 (and optionally the shopping query table 143) to identify queries having a comparison term or a comparison question and create a table or list of those comparison queries.

In block 430, the alternatives module 133 computes or identifies the number of times that each comparison query was received by the Internet search engine 140 (and optionally the product catalog system 130). This count is referred to as an occurrence count for each comparison query. In block 435, the alternatives module 133 discards queries having an occurrence count that does not meet or exceed a threshold from the analysis and retains the queries having an occurrence count that meets or exceeds the threshold. This block 435 serves to filter out noise in the data.

In block 440, the alternatives module 133 computes the number of comparison queries for each pair of compared products. In one embodiment, the alternatives module 133 analyzes the comparison queries to identify each pair of products compared in at least one query. For example, the alternatives module 133 may identify the two products for each comparison query and add those two products to a list or table. For each pair of compared products, the alternatives module 133 computes the total number of times that the pair of products was included in a comparison query together. That is, the alternatives module 133 computes the total number of times that the two products were compared in a comparison query. This number can be designated as a comparison count for the pair of products. Equations 5-7 provide one method for computing the comparison count for a pair of products, "r" and "s," where the term "vs" is used to identify comparison queries.

$$w(s,r) = count(\text{"s vs r"}) \quad \text{Equation 5}$$

$$w(r,s) = count(\text{"r vs s"}) \quad \text{Equation 6}$$

$$v(s,r) = w(s,r) + w(r,s) \quad \text{Equation 7}$$

In Equation 5, w(s,r) is the number of queries having a comparison of product "s" with product "r" where product "s" is disposed in the query before the term "vs" and product "r" is disposed in the query after the term "vs." Similarly, in Equation 6, w(r,s) is the number of queries having a comparison of product "s" with product "r" where product "r" is disposed in the query before the term "vs" and product "s" is disposed in the query after the term "vs." The alternatives module 133 computes the total comparison count, v(s,r), for the products "s" and "r" using Equation 7. Equation 7 provides a symmetrized version of the comparison count as the ordering in the query typically does not matter. For example, a comparison count of v (Product 1, Product 2) gives the number of times in which the queries (Product 1 vs Product 2) and (Product 2 vs Product 1) were received by the Internet search engine 140 (and optionally the product catalog system 130).

In block 445, the alternatives module 133 computes an association weight for each pair of products. In certain exemplary embodiments, the alternatives module 133 computes the association weight for a pair of products (a,b) based on the frequency of a query [x vs y] given by v(x,y) and the strength of the association between the query "x" and the product "a" (given by prob(a|x)) as well as the association between the query "y" and the product "b" (given by prob(b|y). For example, Equation 8 below may be used to compute the association between two products (a,b).

$$u(a,b) = (\text{sum over queries } x)\ (\text{sum over queries } y)\ \text{prob}(a|x) * \text{prob}(b|y) * v(x|y) \quad \text{Equation 8}$$

As shown in Equation 8, the association u(a,b) includes the sum over queries "x" and the sum over queries "y." In this way, each of the queries "x" that are deemed to be associated with the product "a" and not discarded in the previous blocks of the method 215 are included in this computation. Similarly, each of the queries "y" that are deemed to be associated with the product "b" and not discarded in the previous blocks of the method 215 are included in this computation. That is, each product-query pair (a,x) remaining in the analysis for the product "a" and each product-query pair (b,y) remaining in the analysis for the product "b" are used to determine whether products "a" and "b" are associated. In particular, the computation of (prob(a|x)*prob(b|y)*v(x|y)) is computed for each pair of queries (x,y) remaining in the analysis and summed together to obtain the association weight for the product pair (a,b).

For example, consider two products, the Apple iPad and the Motorola Xoom tablet computers. A user may submit a query for the Apple iPad and the Motorola Xoom in a variety of ways that lead to selections of product offers related to these products. For example, users may submit queries "Motorola Xoom," "Xoom tablet," and "Motorola tablet" in an attempt to obtain information regarding the Motorola Xoom tablet computer. A similar set of queries may be submitted by users searching for information regarding an Apple iPad. In this example, each of the queries that are deemed to be associated with the Motorola Xoom and each of the queries deemed to be associated with the Apple iPad (based on the fact that product-query pairs remain in the analysis) are used in Equation 8 to determine whether the Motorola Xoom is an alternative to the Apple iPad.

In block 450, the alternatives module 133 retains pairs of products having an association weight that meets or exceeds a certain threshold and discards the pairs of products having an association weight that does not meet or exceed the threshold. The retained pairs of products are considered by the alternatives module 133 to be alternative products. Some products may be paired with more than one other product in the retained product pairs. Thus, some products may have more than one alternative product. The alternatives module 133 can link or otherwise associate products with their identified alternative products.

In block 455, for products having more than one alternative product, the alternatives module 133 ranks the alternative products based on the association weight. In this way, the selection engine 135 may select alternative products to transmit based on the ranking. For example, if the selection engine 135 selects Tablet Computer A to provide information for based on a query, the selection engine 135 may select alternative products based on their association weights relative to Tablet Computer A.

The method 215 of FIG. 2 can be modified to account for variants of products. For example, a product may come in several colors and/or with several capacities. This can cause the selections of products to be split between the different variants rather than the actual product. For example, product selections for queries for a particular music player that comes in various colors and memory capacities may be split between the different variants of the music player. If unaccounted for, this can lead to the product-query pairs for the queries and the music player failing to meet the thresholds discussed in blocks 415-420 of the method 215 of FIG. 4.

One way to account for this split is to group the variants of each product together and assign the product offer selections to the most popular variant or the most selected variant. In this way, the variant having the product offer selections assigned thereto will typically be associated with the queries and considered in the association weight computations of block 445.

This also can account for variants when selecting product alternatives to provide to the end users in response to queries for a target product. For example, it may be desirable to provide information for products that are true alternatives rather than information for variants of the target product. By assigning the selections to the one variant, that one variant will typically be the only variant that is associated as an alternative product to other products as the other variants will typically be discarded from the analysis in blocks 415-420 of the method 215. Thus, information for the one popular or most often selected variant may be provided as an alternative product rather than providing information for each of the variants. This enables other product alternatives to be provided in place of the product variants that would otherwise be provided.

General

The exemplary methods and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for identifying alternative products, the method comprising:
   maintaining, by a computer, information regarding a plurality of products;
   analyzing, by the computer, information regarding a plurality of queries to identify a plurality of product-query pairs, each product-query pair comprising a query and a product that was previously selected from results for the query;
   for each product-query pair, determining, by the computer, a number of times that the product was selected from results for the query;
   for each product-query pair, determining, by the computer, whether the query of the product-query pair is associated with the product of the product-query pair based on the number of times that the product was selected from results for the query relative to a number of times that results for the query were presented;
   analyzing, by the computer, the information regarding the plurality of queries to identify comparison queries directed to a comparison between two or more of the plurality of products;
   determining, by the computer, a first value by multiplying a ratio between a number of times that a first product (a) was selected from results for a query (x) by a ratio between a number of times that a second product (b) was selected from results for a query (y);
   determining, by the computer, a second value by multiplying the first value by a number of times that the comparison query comprising the query (x) and the query (y) was received;
   determining, by the computer, an association weight by summing the second value over all queries (x) and all queries (y);
   determining, by the computer, whether the association weight meets or exceeds a threshold; and
   in response to the association weight meeting or exceeding the threshold, determining, by the computer, that the first product is an alternative to the second product.

2. The computer-implemented method of claim 1, wherein each comparison query comprises a comparison term disposed between a first query term for one of the plurality of products and a second query term for another one of the plurality of products.

3. The computer-implemented method of claim 1, wherein each comparison query comprises a comparison question in combination with a first query term for one of the plurality of products and a second query term for another one of the plurality of products.

4. The computer-implemented method of claim 1, wherein determining, for each product-query pair, whether the query of the product-query pair is associated with the product of the product-query pair further comprises:
   computing a ratio between the number of times that the product of the product-query pair was selected from results for the query of the product-query pair and a number of times that the query was received;

determining whether the ratio meets or exceeds a threshold; and in response to the ratio meeting or exceeding the threshold, determining that the query of the product-query pair is associated with the product of the product-query pair.

5. The computer-implemented method of claim 1 wherein determining, for each product-query pair, whether the query of the product-query pair is associated with the product of the product-query pair further comprises:

multiplying the number of times that the product of the product-query pair was selected from results for the query of the product-query pair by a weighted version of a number of product offers maintained by the computer for the product of the product-query pair to determine an intermediate value;

computing a ratio between the intermediate value and a number of times that the query of the product-query pair was received to determine an association value;

determining whether the association value meets or exceeds a threshold; and in response to the association value meeting or exceeding the threshold, determining that the query of the product-query pair is associated with the product of the product-query pair.

6. The computer-implemented method of claim 5, wherein the weighted version of the number of product offers maintained by the computer for the product of the product-query pair comprises a square root of the number of product offers maintained by the computer for the product of the product-query pair.

7. The computer-implemented method of claim 1, further comprising:

computing an association weight for each of a plurality of products relative to the second product;

ranking the plurality of products based on association weight;

receiving a query for the second product; and transmitting information regarding the second product and information regarding at least one of the plurality of products based on the association weight in response to a query for the second product, the at least one product being selected based on association weight.

8. The computer-implemented method of claim 1, wherein analyzing the information regarding the plurality of queries to identify comparison queries comprises analyzing text strings for each of the plurality of queries to identify queries having a comparison term.

9. The computer-implemented method of claim 1, wherein the information regarding the plurality of queries comprises information regarding a plurality of queries received at an Internet search engine and information regarding a plurality of queries received at an Internet shopping website, wherein the information regarding the plurality of queries received at the Internet search engine is used to identify the comparison queries and the information regarding the plurality of queries received at the Internet shopping website is used to identify the plurality of product-query pairs.

10. A computer program product, comprising:

a non-transitory computer-readable medium having computer-readable program code embodied therein for identifying alternative products, the computer-readable medium comprising:

computer-readable program code for analyzing information regarding a plurality of queries to identify a plurality of product-query pairs, each product-query pair comprising a query and a product that was previously selected from results for the query;

computer-readable program code for determining, for each product-query pair, a number of times that the product was selected from results for the query;

computer-readable program code for determining, for each product-query pair, whether the query of the product-query pair is associated with the product of the product-query pair based on the number of times that the product was selected from results for the query;

computer-readable program code for analyzing the information regarding the plurality of queries to identify comparison queries directed to a comparison between two or more of a plurality of products;

computer-readable program code for determining a first value by multiplying a ratio between a number of times that a first product (a) was selected from results for a query (x) by a ration between a number of times that a second product (b) was selected from results for a query (y);

computer-readable program code for determining a second value by multiplying the first value by a number of times that the comparison query comprising the query (x) and the query (y) was received;

computer-readable program code for determining an association weight by summing the second value over all queries (x) and all queries (y);

computer-readable program code for determining whether the association weight meets or exceeds a threshold; and computer-readable program code for, in response to the association weight meeting or exceeding the threshold, determining that the first product is an alternative to the second product.

11. The computer program product of claim 10, wherein each comparison query comprises a comparison term disposed between a first query term for one of the plurality of products and a second query term for another one of the plurality of products.

12. The computer program product of claim 10, wherein each comparison query comprises a comparison question in combination with a first query term for one of the plurality of products and a second query term for another one of the plurality of products.

13. The computer program product of claim 10, wherein the computer-readable program code for determining, for each product-query pair, whether the query of the product-query pair is associated with the product of the product-query pair further comprises:

computer-readable program code for computing a ratio between the number of times that the product of the product-query pair was selected from results for the query of the product-query pair and a number of times that the query was received;

computer-readable program code for determining whether the ratio meets or exceeds a threshold; and computer-readable program code for determining that the query of the product-query pair is associated with the product of the product-query pair in response to the ratio meeting or exceeding the threshold.

14. The computer program product of claim 10, wherein the computer-readable program code for determining, for each product-query pair, whether the query of the product-query pair is associated with the product of the product-query pair further comprises:
- computer-readable program code for multiplying the number of times that the product of the product-query pair was selected from results for the query of the product-query pair by a weighted version of a number of product offers maintained by the computer for the product of the product-query pair to determine an intermediate value;
- computer-readable program code for computing a ratio between the intermediate value and a number of times that the query of the product-query pair was received to determine an association value;
- computer-readable program code for determining whether the association value meets or exceeds a threshold; and
- computer-readable program code for determining that the query of the product-query pair is associated with the product of the product-query pair in response to the association value meeting or exceeding the threshold.

15. The computer program product of claim 14, wherein the weighted version of the number of product offers maintained by the computer for the product of the product-query pair comprises a square root of the number of product offers maintained by the computer for the product of the product-query pair.

16. The computer program product of claim 10, further comprising:
- computer-readable program code for computing an association weight for each of a plurality of products relative to the second product;
- computer-readable program code for ranking the plurality of products based on association weight;
- computer-readable program code for receiving a query for the second product; and
- computer-readable program code for transmitting information regarding the second product and information regarding at least one of the plurality of products based on the association weight in response to a query for the second product, the at least one product being selected based on association weight.

17. The computer program product of claim 10, wherein the computer-readable program code for analyzing the information regarding the plurality of queries to identify comparison queries comprises computer-readable program code for analyzing text strings for each of the plurality of queries to identify queries having a comparison term.

18. The computer program product of claim 10, wherein the information regarding the plurality of queries comprises information regarding a plurality of queries received at an Internet search engine and information regarding a plurality of queries received at an Internet shopping website, wherein the information regarding the plurality of queries received at the Internet search engine is used to identify the comparison queries and the information regarding the plurality of queries received at the Internet shopping website is used to identify the plurality of product-query pairs.

19. A system for determining whether a first product is an alternative of a second product, the system comprising:
- a processor, computer-readable memory, and a non-transitory computer-readable storage device;
- first program instructions for analyzing information regarding a plurality of queries to identify a plurality of product-query pairs, each product-query pair comprising a query and a product that was previously selected from results for the query;
- second program instructions for determining, for each product-query pair, a number of times that the product was selected from results for the query;
- third program instructions for determining, for each product-query pair, whether the query of the product-query pair is associated with the product of the product-query pair based on the number of times that the product was selected from results for the query;
- fourth program instructions for analyzing the information regarding the plurality of queries to identify comparison queries directed to a comparison between two or more of a plurality of products;
- fifth program instructions for determining a first value by multiplying a ratio between a number of times that a first product (a) was selected from results for a query (x) by a ratio between a number of times that a second product (b) was selected from results for a query (y);
- sixth program instructions for determining a second value by multiplying the first value by a number of times that a comparison query comprising the query (x) and the query (y) was received;
- seventh program instructions for determining an association weight by summing the second value over all queries (x) and all queries (y);
- eighth program instructions for determining whether the association weight meets or exceeds a threshold; and
- ninth program instructions for, in response to the association weight meeting or exceeding the threshold, determining that the first product is an alternative to the second product;
- wherein the program instructions are stored on the non-transitory computer-readable storage device for execution by the processor via the computer-readable memory.

20. The system of claim 19, wherein the comparison query comprises a comparison term disposed between the first query term and the second query term.

21. The system of claim 19, wherein each comparison query comprises a comparison question in combination with the first query term and the second query term.

22. The system of claim 19, further comprising:
- tenth program instructions for identifying at least one query term associated with the first product;
- eleventh program instructions for identifying at least one query term associated with the second product; and
- twelfth program instructions for determining a number of times that a query term associated with the first product is included in a comparison query with a query term associated with the second product.

23. The system of claim 22, further comprising:
- thirteenth program instructions for determining, for each query term associated with the first product, a measure of association between the first product and the query term associated with the first product; and
- fourteenth program instructions for determining for each query term associated with the second product, a measure of association between the second product and the query term associated with the second query.

24. The system of claim 23, wherein the measure of association between the first product and the query term associated with the first product comprises a ratio of a number of times that the first product was selected from results for the query comprising the query term associated with the first product to a number of times that the query comprising the query term associated with the first product was received.

25. The system of claim 19, wherein the information regarding the plurality of queries comprises information regarding a plurality of queries received at an Internet search engine and information regarding a plurality of queries received at an Internet shopping website, wherein the information regarding the plurality of queries received at the Internet search engine is used to identify the comparison queries and the information regarding the plurality of queries received at the Internet shopping website is used to identify the plurality of product-query pairs.

* * * * *